United States Patent [19]

Preis

[11] Patent Number: 4,828,049
[45] Date of Patent: May 9, 1989

[54] PORTABLE HANDHELD POWER-DRIVEN TOOL
[75] Inventor: Erich Preis, Weinstadt, Fed. Rep. of Germany
[73] Assignee: Licentia Patent-Verwaltungs-GmbH, Frankfurt am Main, Fed. Rep. of Germany
[21] Appl. No.: 107,360
[22] Filed: Oct. 9, 1987
[30] Foreign Application Priority Data
   Oct. 24, 1986 [DE] Fed. Rep. of Germany ....... 3636229
[51] Int. Cl.⁴ ............................................. B23B 45/00
[52] U.S. Cl. ................................... 173/163; 81/57.11
[58] Field of Search ................ 173/163; 408/124, 238, 408/241 R; 74/785, 801, 768; 81/57, 57.11
[56] References Cited
U.S. PATENT DOCUMENTS
3,195,704  7/1965  Linsker ................................ 173/163

FOREIGN PATENT DOCUMENTS
957936  5/1964  United Kingdom ................ 408/124

Primary Examiner—Frank T. Yost
Assistant Examiner—James L. Wolfe
Attorney, Agent, or Firm—Walter Ottesen

[57] ABSTRACT

An electric handtool includes a two-stage speed reduction gear unit in which each stage includes a sun gear and two planet gears carried by a carrier. The carrier of the first stage has a small diameter hexagonal first socket for receiving and entraining, for example, the shank of a chuck. The carrier of the second stage has a large diameter hexagonal second socket for receiving and entraining, for example, the shank of a screwdriver bit as well as a passage bore to provide access to the first socket. The socket and bore in the second stage are dimensioned so that the shank of the chuck can extend therethrough without being entrained thereby.

9 Claims, 3 Drawing Sheets

PORTABLE HANDHELD POWER-DRIVEN TOOL

FIELD OF THE INVENTION

The invention relates to a portable, handheld power-driven tool such as a cordless tool wherein a battery supplied motor drives a tool holder via a speed-reduction gear unit. The power-driven tool could also have an electric motor supplied from line current or even be driven by an air motor.

BACKGROUND OF THE INVENTION

Electric handtools with speed reducing gear units are disclosed in German published patent application DE-OS Nos. 24 41 047 and 33 22 876. DE-OS No. 24 41 047 relates to a drill driven by a single-stage planetary gear unit and DE-OS No. 33 22 876 discloses a screwdriver which is rotatable via a double planetary gear unit in order to tighten screws.

Assuming like rotational speed and torque of the tool drive motor at the output thereof, higher output rotational speed and correspondingly lower output torque are provided by a single-stage planetary gear unit compared to a double planetary gear unit. Consequently, a handtool with a single planetary gear unit is particularly suitable for drilling and a handtool with a double planetary gear unit for driving and removing screws.

SUMMARY OF THE INVENTION

In view of the above, it is an object of the invention to provide a power-driven handtool of the kind described which is more universally usable and is capable of use for operations requiring different rotational speeds and torques.

Accordingly, it is a feature of the power-driven handtool of the invention to include a multi-stage speed-reduction gear unit, the stage preceding the last stage of the unit being provided with entraining means for rotatively entraining a shank and the last stage being constructed to permit such entrainment without rotary entrainment of said shank by the last stage and to permit power take-off directly from the last stage.

In a preferred embodiment of the invention, the gear unit includes two planetary gear stages each including a carrier carrying the planet gears of that stage. A first entraining means is configured as a polygonal first socket in the carrier of the first stage and the carrier of the second stage includes a passage bore coaxial with the first socket. A second entraining means for rotatively entraining a further shank is also provided in the carrier of the second stage.

In another preferred embodiment, the gear unit includes two planetary gear stages each including a carrier carrying the planet gears of that stage. The first entraining means is formed in a hub-like portion of the carrier of the first stage which also defines the sun gear of the second stage. The carrier of the second stage is provided with a passage bore to permit coupling of a shank with the first socket.

According to a further feature of the invention, the entraining means of the first stage is preferably provided with detent means for latching the shank of the work tool therein. For example, the detent means can include a recess formed in the shank and a spring-loaded ball mounted in the wall of the socket for engagement in the recess of the shank or vice versa.

BRIEF DESCRIPTION OF THE DRAWINGS

The invention will now be described in more detail with reference to the drawings, wherein.

DESCRIPTION OF THE PREFERRED EMBODIMENTS OF THE INVENTION

Figure 1:
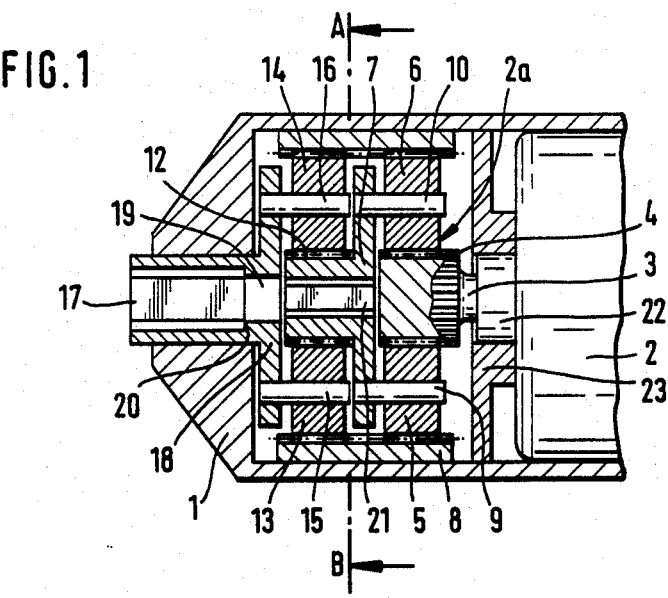
FIG. 1 is a longitudinal section view of a two-stage speed reduction gear unit of a battery-operated handtool embodying the invention.

Referring now to the drawings, FIG. 1 shows an electric handtool with a drive motor 2 powered by batteries (not shown) and a two-stage speed step-down planetary gear unit 2a mounted in a housing 1. The first stage of the gear unit 2a comprises: a sun gear 4 in the form of a pinion mounted on or integrally formed on an armature shaft 3 of the drive motor 2, two planetary gears 5 and 6 carried by a carrier 7, and an internally toothed outer gear rim or internal gear 8 which is stationary. The armature shaft 3 is mounted in a rolling bearing 22 which is arranged in an end plate 23.

The carrier 7 includes shaft pins, 9 and 10 on which respective planetary gears 5 and 6 are rotatably mounted and is integrally formed with sun gear 12 of the second stage of the gear unit 2a. The second stage also includes two planetary gears 13 and 14 which mesh with the sun gear 12 and are driven thereby. The planetary gears 13 and 14 likewise mesh with internal gear 8 and are mounted on respective shaft pins 15 and 16 which are arranged in a carrier 18 having rotary entraining means 17 for entraining a tool. The entraining means 17 is formed as a polygonal, preferably hexagonal, socket in the illustrated embodiment, but could instead be a threaded bore or other form of receptacle or have a four-cornered cross section.

The carrier 18 is also provided with a passage bore 19 having a diameter smaller than the key or maximum width of the hexagonal socket 17 so that a shoulder-like abutment 20 is formed at the base of the socket 17.

The sun gear 12 of the second stage is formed on the carrier 7 of the first stage and includes rotary entraining means 21 which too is formed as a polygonal, preferably hexagonal, socket. The entraining means 21 can, however, be of a suitable different form.

Figure 2:
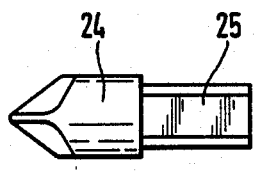
FIG. 2 is a side elevation view of a screwdriver bit for coupling to the second stage of the gear unit.

FIG. 2 shows a screwdriver bit 24 which has a shank 25 of hexagonal cross section corresponding to the drive socket constituting the entraining means 17. Instead of a hexagon, the shank 25 can be of any other suitable cross-sectional shape corresponding to that of the entraining means 17.

Figure 3:
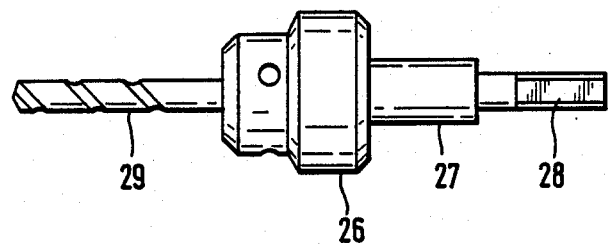
FIG. 3 is a side elevation view of a tool chuck for coupling to the first stage of the gear unit.
Figure 4:
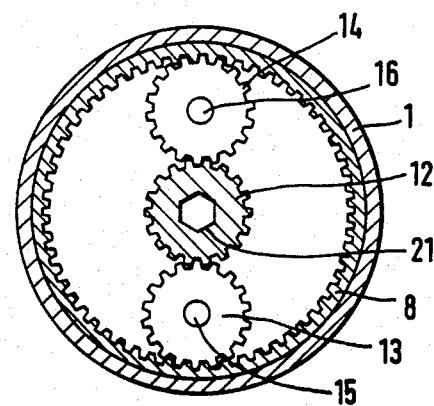
FIG. 4 is a transverse cross section along the line A-B of FIG. 1.

FIG. 3 shows a tool chuck 26, in the form of a three-jaw collet, which has a guide portion 27 and a shank 28 of hexagonal cross section corresponding to that of the socket constituting the entraining means 21. Again, the cross-sectional shape of the shank 28 can be different, depending on that of the socket of the entraining means 21. The chuck 26 is shown fitted with a drill bit 29.

Figure 5:
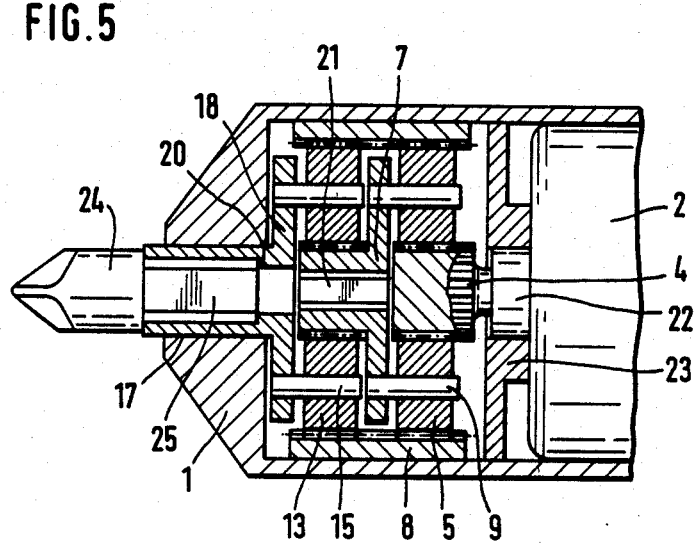
FIG. 5 is a view similar to FIG. 1 showing the screwdriver bit of FIG. 2 coupled to the second stage of the gear unit.

For use of the handtool as a power screwdriver, the shank 25 of the screwdriver bit 24 is pushed into the socket of the entraining means 17 up to the abutment 20 as shown in FIG. 5. The rotational speed of the screwdriver bit 24 will therefore correspond to the rotational speed of the carrier 18 of the second stage of the gear unit 2a. Accordingly, both step-down stages of the gear unit are fully effective.

Figure 6:
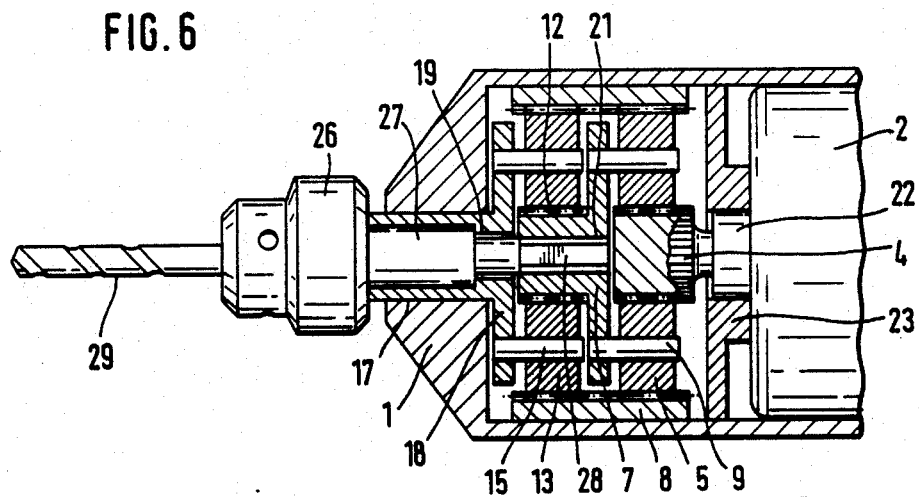
FIG. 6 is a view similar to FIG. 1 showing the chuck of FIG. 3 seated in the tool entraining means formed in the sun gear of the first stage; and, FIG. 7 is a fragmentary view of the carrier of the planetary gear unit of the first stage to show how a detent can hold a work tool in its socket during operation of the motor-driven tool.

When using the handtool as, for example, a drill, the screwdriver bit 24 is removed from the entraining means 17 and the shank 28 of the chuck 26 is pushed through the passage bore 19 in the carrier 18 and into the entraining means 21 configured as a hexagonal socket in the carrier 7. The guide portion 27 in this situation fits into, but is not entrained by, the socket of the entraining means 17. FIG. 6 shows the handtool equipped in this manner. It is clear from FIG. 6 that the chuck 26 with the drill 29 will rotate at the speed of the carrier 7 of the first step-down stage of the gear unit. The second step-down stage of the unit is thus bridged over or bypassed.

In the case of, for example, a rotational speed of the armature shaft 3 of 15,000 revolutions per minute, the step-down ratio of the first gear stage can be 20:1 and the step-down ratio of the second gear stage 12.5:1. The screwdriver bit 24 will then rotate at a speed of 60 revolutions per minute and the chuck 26 with the drill 29 at a speed of 750 revolutions per minute. By virtue of these different rotational speeds, or other similarly different speeds, drilling can be carried out before driving a screw which is not otherwise practicable with a handtool providing an output speed in the order of 60 revolutions per minute for screw-driving purposes.

In the case of a gear unit with three or even more speed step-down stages, the same principle can be employed, with two or more step-down stages being bridged over or bypassed by means of, for example, appropriate axial passage bores in the respective planet gear carriers. Thus, for example, in a three-stage step-down unit the first stage can be used for fine drilling in plates or other components at about 2,800 revolutions per minute, the second stage can be used for coarser drillings at about 750 revolutions per minute, and the third and last stage can be used for driving screws for which higher torque is required, at about 60 revolutions per minute.

Figure 7:
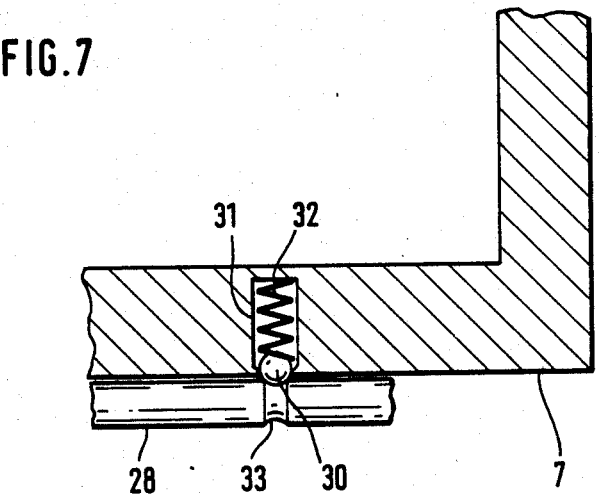

Latching the chuck 26 in the rotary entraining means 17 and/or 21 can take place by means of at least one detent ball which is spring-loaded and which is positioned in the rotary entraining means so as to be able to detent in a circumferential groove of the guide portion 27 or shank 28. FIG. 7 shows a detent ball 30 mounted in a bore 31 of carrier 7 with a spring 32 resiliently biasing the ball 30 into latching engagement with a groove 33 formed on the shank 28 of the chuck 26. Conversely, such a circumferential groove can be provided in the socket of the entraining means 17 and/or 21 and a spring-loaded detent ball can be mounted in the guide portion 27 or shank 28. The same applies to the location of the screwdriver bit 24 in its entraining means 17 defined by a socket.

It is understood that the foregoing description is that of the preferred embodiments of the invention and that various changes and modifications may be made thereto without departing from the spirit and scope of the invention as defined in the appended claims.

What is claimed is:

1. A handheld portable motor-driven tool for driving separate work tools such as drill bits and screwdriver bits having a driving shank, the motor-driven tool comprising:

a housing;

motor means mounted in said housing and having a drive member rotatable at a drive speed;

a multi-stage gear system for reducing the drive speed, said multi-stage system defining a longitudinal axis and including:

a next-to-last gear stage operatively connected to said drive member of said motor for delivering a next-to-last output speed less than said drive speed;

a last gear stage mounted on said axis ahead of said next-to-last gear stage and being operatively connected to the latter for reducing said next-to-last output speed to a last output speed;

said next-to-last gear stage including next-to-last entrainment means as an integral part thereof for receiving the shank of one of the work tools therein for driving the one work tool at said next-to-last output speed;

said last gear stage including last entrainment means disposed forward of said next-to-last entrainment means and also being disposed on said axis for accommodating another one of the work tools therein for driving the latter at said last output speed; and, passage means formed in said last gear stage so as to extend through the latter and said last entrainment means to define a clear passage extending to and communicating with said next-to-last entrainment means for accommodating the shank of the one work tool therein so as to permit the work tool to project outwardly beyond said last gear stage and to rotate relative to said last gear stage and said last entrainment means.

2. The handheld portable motor-driven tool of claim 1, said last and next-to-last gear stages being respective planetary gear stages.

3. A handheld portable motor-driven tool for driving separate work tools such as drill bits and screwdriver bits having a drive shank, the motor-driven tool comprising:

a housing;

electric motor means mounted in said housing and having a drive member rotatable at a drive speed;

first stage planetary gear means defining a longitudinal axis and being mounted in said housing adjacent said motor and being operatively connected to said drive member for reducing said drive speed down to a first output speed;

second stage planetary gear means mounted on said axis in said housing ahead of said first stage planetary gear means and being operatively connected to the latter for reducing said first output speed to a second output speed;

said first stage planetary gear means including first entrainment means as an integral part thereof for receiving the shank of one of the work tools therein for driving the same at said first output speed;

said second stage planetary gear means including second entrainment means disposed forward of said first entrainment means and also being disposed on said axis for receiving the shank of an other one of the work tools therein for driving the same at said second output speed; and, passage means formed in said second planetary gear means so as to extend through the latter and said second entrainment means to define a clear passage extending to and communicating with said first entrainment means for accommodating the shank of the one work tool therein so as to permit the work tool to project outwardly beyond said second stage planetary gear means and to rotate relative to the latter and said second entrainment means.

4. The handheld portable motor-driven tool of claim 2, said drive member of said motor being a pinion defining a first sun gear for said first stage planetary gear means, said first stage planetary gear means including first internal gear means and a first carrier having a plurality of planet gears mounted thereon for meshing with said first sun gear and said internal gear thereby rotating said first carrier at said first output speed;

said first carrier having a hub-like projection defining a second sun gear of said second stage planetary gear means;

said first entrainment means being a first socket formed in said hub-like projection and having a predetermined cross section for receiving the shank of the one work tool therein;

said second stage planetary gear means including second internal gear means and a second carrier mounted ahead of said first carrier and having a plurality of planet gears mounted thereon for meshing with said second internal gear means and said second sun gear thereby rotating said second carrier at said second output speed;

said second entrainment means being a second socket formed in said second carrier and having a predetermined cross section for receiving the shank of the other one of the work tools therein; and, said passage bore means being a passage bore formed in said second carrier so as to communicate with said second socket and to be coaxial with said first socket and said second socket thereby permitting the shank of the one tool to be passed through said second socket and said passage bore for seating the same in said first socket.

5. The handheld portable motor-driven tool of claim 4, said second socket having a diameter greater than said passage bore so as to form a peripheral seat disposed in surrounding relationship to said passage bore thereby defining a base of said second socket.

6. The handheld portable motor-driven tool of claim 5, said first and second sockets each having a polygonal cross section.

7. The handheld portable motor-driven tool of claim 6, said first and second sockets each having a hexagonal cross section.

8. The handheld portable motor-driven tool of claim 3, the motor-driven tool further comprising detent means at the interface of said shank of said one work tool and said first entrainment means for holding said one tool bit therein during operation of the motor-driven tool.

9. The handheld portable motor-driven tool of claim 8, said detent means comprising a resiliently biased detent ball mounted in one of said shank and said first entrainment means and detent recess means formed in the other one of said shank and said first entrainment means.

* * * * *